W. P. & S. G. THOMSON.
SPLICE BAR FOR RAIL JOINTS.
APPLICATION FILED MAY 23, 1907.
986,326.
Patented Mar. 7, 1911.
4 SHEETS—SHEET 1.
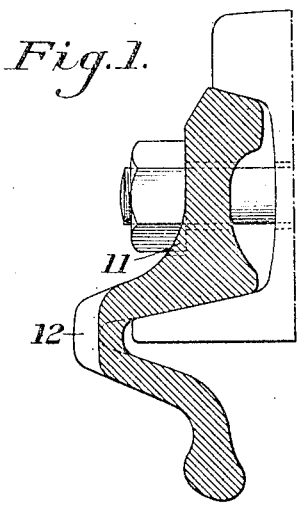
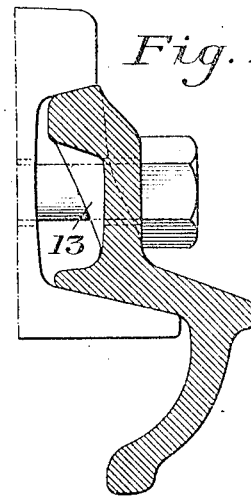
Fig. 1. Fig. 2.
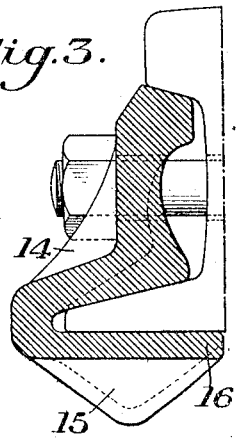
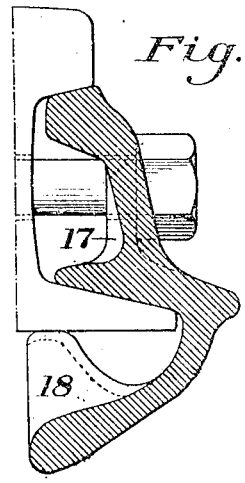
Fig. 3. Fig. 4.
WITNESSES
R A Balderson
W W Swartz
INVENTORS
W. P. Thomson
S. G. Thomson
by Bakewell & Byrnes
their attys.

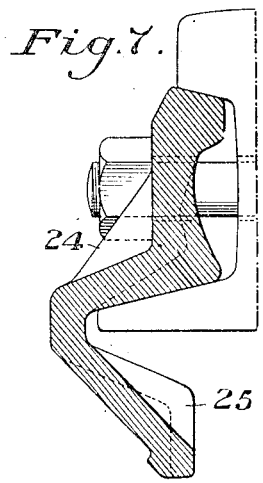
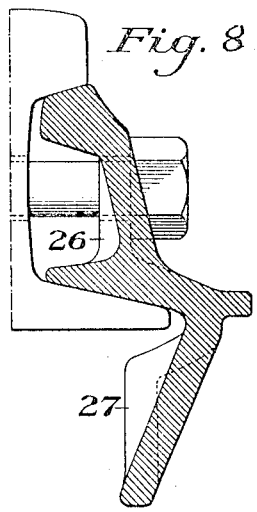
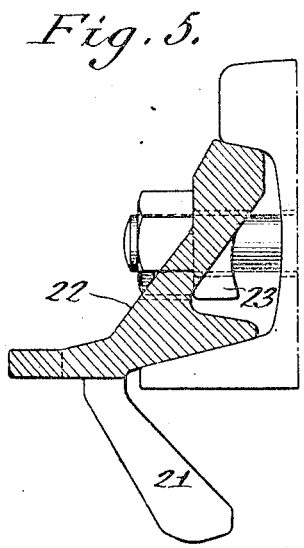
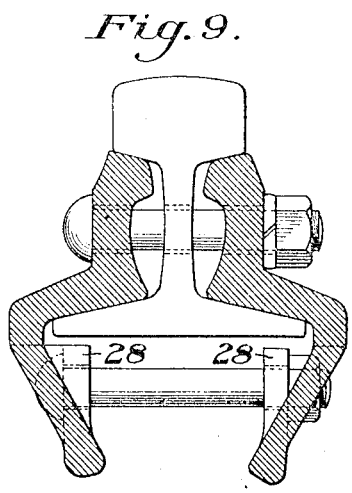
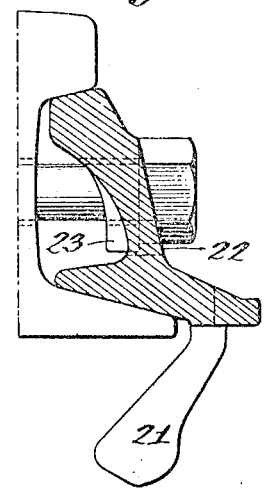
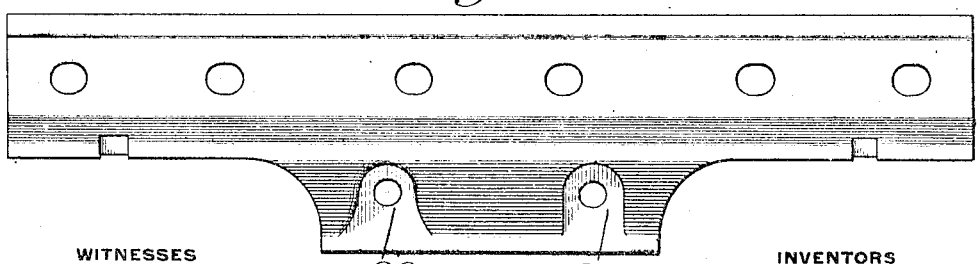

W. P. & S. G. THOMSON.
SPLICE BAR FOR RAIL JOINTS.
APPLICATION FILED MAY 23, 1907.

986,326.

Patented Mar. 7, 1911.

WITNESSES
R H Balderson
W W Swartz

INVENTORS
W. P. Thomson
S. G. Thomson
by Bakewell & Byrnes
their Attys

W. P. & S. G. THOMSON.
SPLICE BAR FOR RAIL JOINTS.
APPLICATION FILED MAY 23, 1907.
986,326.
Patented Mar. 7, 1911.
4 SHEETS—SHEET 4.
Fig.15.
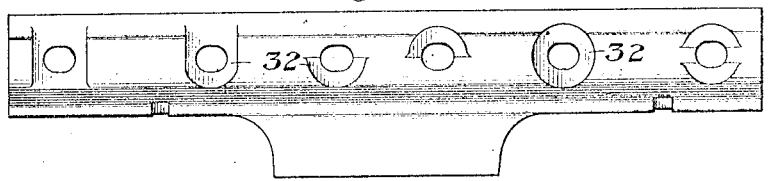
Fig.16.     Fig.17.
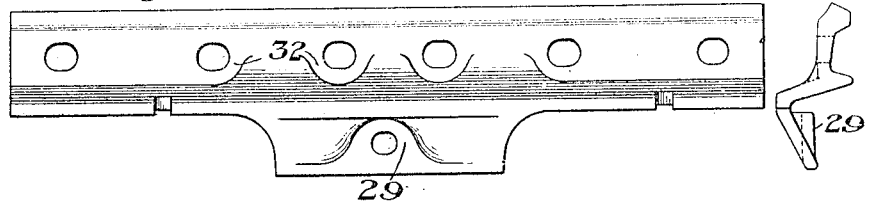 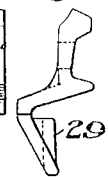
Fig.18.     Fig.19.
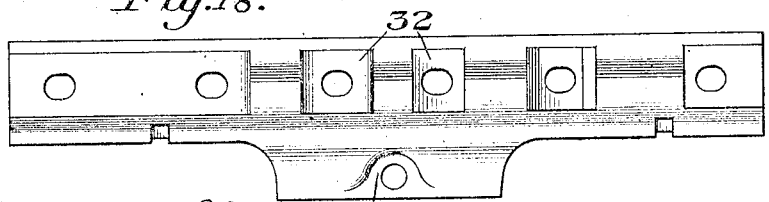 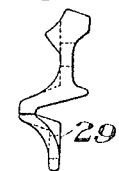
Fig.20.
Fig.21.     Fig.22.
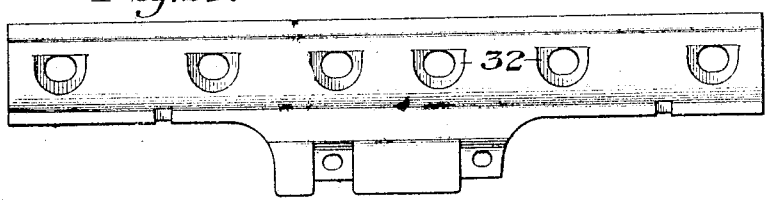 
WITNESSES
R A Balderson
W W Swartz
INVENTORS
W. P. Thomson
S. G. Thomson
by Bakewell & Byrnes,
their Attys.

UNITED STATES PATENT OFFICE.

WILLIAM P. THOMSON, OF PHILADELPHIA, PENNSYLVANIA, AND SAMUEL G. THOMSON, OF BUFFALO, NEW YORK, ASSIGNORS TO THOMSON-THOMSON COMPANY, OF PHILADELPHIA, PENNSYLVANIA, A PARTNERSHIP.

SPLICE-BAR FOR RAIL-JOINTS.

986,326.  Specification of Letters Patent. Patented Mar. 7, 1911.

Application filed May 23, 1907. Serial No. 375,339.

*To all whom it may concern:*

Be it known that we, WILLIAM P. THOMSON, of Philadelphia, in the county of Philadelphia and State of Pennsylvania, and SAMUEL G. THOMSON, of Buffalo, Erie county, State of New York, have invented a new and useful Splice-Bar for Rail-Joints, of which the following is a full, clear, and exact description, reference being had to the accompanying drawings, forming part of this specification, in which—

Figures 1 to 9, inclusive, are sectional views showing different embodiments of our invention; Fig. 10 is a side view of one form of splice bar; Figs. 11 and 13 are sectional views illustrating other forms; Figs. 12 and 14 are side views; Figs. 15, 16, 18, 21 are side views of splice bars embodying our invention; Fig. 17 is an end view of the bar shown in Fig. 16; Fig. 19 is an end view of the bar shown in Fig. 18; Fig. 20 is a top plan view of the bar shown in Fig. 18; and Fig. 22 is an end view of the bar shown in Fig. 21.

The object of our invention is to reduce to a minimum the amount of metal necessary to secure a maximum degree of vertical and lateral stiffness in a splice bar for rails, and at the same time to provide vertical bolting faces adjacent to the bolting holes through these bars, without making the metal at the bolt holes comparatively thicker than between the bolt holes.

Our invention consists essentially in displacing a portion of the bar or plate from its form as originally rolled, in such a manner that the displaced portion will serve either as a decided reinforcement without the use of additional metal, or will convert a portion of the bar which did not originally stand in a vertical position into a section which will afford vertical bolting faces adjacent to the bolt holes through the bar. The principle involved is the same in both cases. In the case of a rolled angle bar having originally a vertical bolting face, certain portions between the bolt holes may be forced outward in such a manner as to afford a bulging reinforcement for the bar which will not interfere with the turning of the nuts on the vertical bolting faces lying between two of such reinforcements. In the case of a bar whose upper member is not originally provided with a vertical bolting face, a portion of the bar adjacent to the bolt hole may be displaced to provide a vertical bolting face. While these operations preferably involve the stretching of the metal forming the sides of the portion thus displaced, this stretching is not essential to the application of our invention, as the metal may be forced out of position in such an abrupt manner that it will be cut loose from the bar at one or more points and at the same time provide for a material reinforcement for a vertical bolting face.

The invention is also applicable for the same purpose and with the same conservation in the amount of metal involved to splice bars having extensions below the base of the rail, in which the object to be attained may be either to afford material reinforcement without the use of additional metal or to provide vertical bolting faces adjacent to such bolt holes as it may be desirable to place in the depending portion or flange.

The invention may also be applied to sections of that portion of the bar which are adjacent to the under side of the head of the rail, without necessarily reducing the top bearing surface of the bar under the head. Portions of the metal may likewise be forced either inward or outward, according to the original conformation of that portion of the bar, the object in all cases being to secure a stronger or more efficient bar with the use of a minimum amount of metal and at the same time provide vertical gripping faces for bolts.

The preferable application of our invention is to roll a freely depending flange splice bar, the upper portion of which does not have a vertical bolting face, and then forge a portion of the web, adjacent to the bolt holes, to secure a vertical bolting face without the use of auxiliary parts.

Fig. 1 shows a splice bar having a portion 11 forged to form a vertical seating face for the nut, and also a portion 12, displaced to provide spiking facilities and additional lateral stiffness.

Fig. 2 shows a bar having an inward displacement 13, between adjacent bolt holes.

Figure 11:
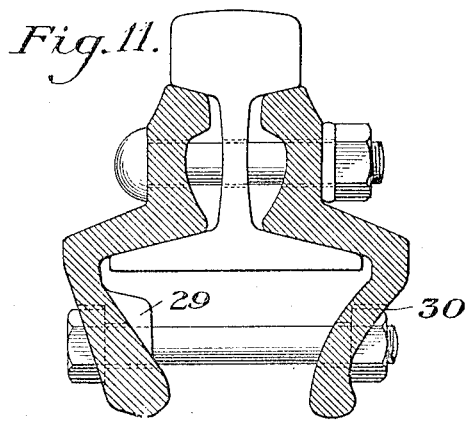

In the bar shown in Fig. 3, there is a diagonal displacement 14 between adjacent bolt holes, and also a downward displacement 15 of a portion or portions of the base member 16.

Fig. 4 shows a lateral displacement 17 of the upper member of the bar and an upward displacement 18 of a portion of the depending member in contact with the under side of the base of the rail.

Figs. 5 and 6 show bars having depending portions 21 between the ties, and with the upper members having inclined faces 22, portions 23 of which are displaced inwardly to provide bolting faces. The displacement in Fig. 5 is such as to partially separate the displaced metal from the adjacent metal.

Fig. 7 shows a vertical gripping face for the bolt in combination with an upward and outward displacement 24 of the upper and base fitting member of the bar, and also a diagonal displacement 25 of the depending member of the bar.

Fig. 8 shows a lateral displacement 26 of the upper member to provide a vertical gripping face for the bolt in combination with reinforcing diagonal web portions between the bolt holes and also a diagonal displacement 27 of the depending member.

Figs. 9 and 10 illustrate splice bars having depending members which are connected by bolts below the base of the rail, portions 28 of said members being displaced inwardly to provide vertical bolting faces. This displacement may, as shown at the right-hand side of Fig. 9, separate a portion thereof from the remaining metal.

Figure 12:
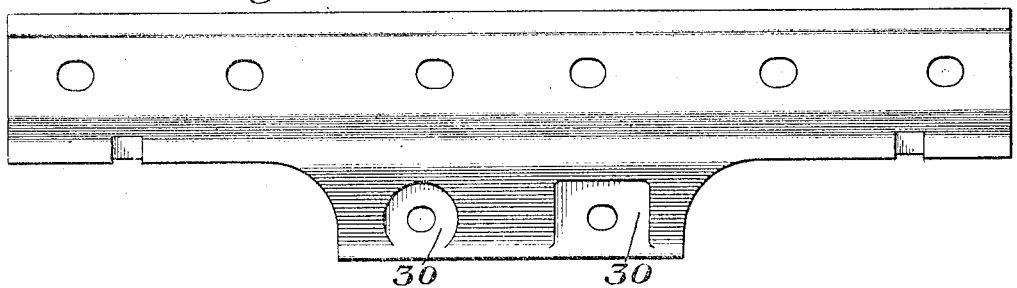
Figure 13:
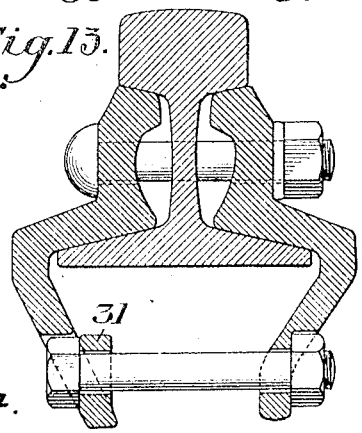
Figure 14:
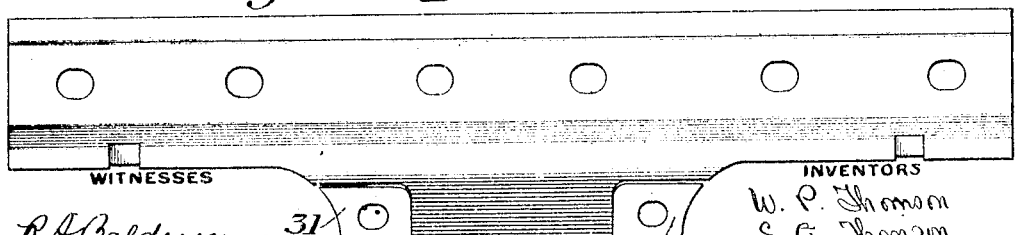

The bar shown in Figs. 11 and 12 has the depending portions of its splice bar provided with inward displacements 29 or 30, to provide the vertical bolting seats. Figs. 13 and 14 illustrate another way of obtaining the same result, one of the bars having an inward displacement 31, which is separated at the top and sides from the adjacent metal.

Figs. 15 to 22 illustrate various ways in which a splice bar having curved or inclined outer faces may be displaced so as to form vertical bolting faces, or reinforcements, or both, and will be readily understood without detailed description. In each of these figures, the numeral 32 indicates a displacement of the metal.

It is evident from our drawings that a displaced portion may be cut loose from the bar along one side of said displaced portion and be joined to the bar by gussets along all or parts of the other sides of said displaced portion; this is shown in Figs. 5, 6, 9, 10, 13, 14, 21 and 22, where the displaced metal is forced abruptly inward along one side of this displaced portion to such a great distance that the metal can not be stretched into a gusset and is thus cut loose entirely where the displacement has been greatest; but the remaining sides of the displaced portion are not displaced so far that they will cut loose and therefore they remain in the form of gussets.

From the foregoing, the wide application of our invention, together with the advantages thereof, will be readily understood and appreciated by those skilled in the art. Inclined, as used in the claims, is to be understood as meaning straight or curved inclined, or a combination of both. It will also be understood that our invention is applicable to splice bars without depending flanges, as well as to bars having such flanges.

We claim:

1. In a rail joint, a splice bar to stand entirely free from the rail web, said bar having an inclined member, and a foot member bearing on top of the rail base, a portion of said inclined member being forced from the general alinement of the bar into a vertical position to form a gripping face for a bolt.

2. In a rail joint, a splice bar to stand entirely free from the rail web, said bar having an upper member with a portion of its outer face slanting, and a foot member bearing on the top of the rail base, part of said slanting outer face being forced into a vertical position to form a gripping face for a bolt.

3. A splice bar for rails, having a foot member to bear on top of the rail base at the rail ends, and a member to extend below the rail base having part of its outer face slanting, part of said slanting outer face being displaced into a vertical position to form a gripping face for a bolt.

4. In a rail joint, a splice bar to stand entirely free from the rail web, said bar having holes for clamping bolts, a foot member to bear on top of the rail base, and an inclined member, said inclined member having its entire sectional thickness displaced adjacent to a bolt hole to form a vertical gripping face.

5. A rail joint having at least one separate splice bar on each side of the rails, said bars each having a foot member to bear on top of the rail base, and a bolting member, the entire sectional thickness of a portion of said bolting member being displaced from the general alinement of the bar to form a gripping face for a bolt.

6. In a rail joint, a splice bar for rails, having a bolting member of substantially uniform sectional thickness throughout its length, with bolt holes through it, and a foot member, said bolting member having vertical portions at two adjacent bolt holes and a portion forced from the general alinement of the bar between said holes, said bar fitting the fishing angles of the rails on only one side of said rails.

7. In a rail joint, a splice bar for rails, having a bolting member of substantially uniform sectional thickness throughout its length with bolt holes through it, and a foot member to contact with the top of the rail base for the entire length of the bar, said bolting member being forced from the general alinement of the bar between two of the bolt holes.

8. In a rail joint, a splice bar to stand entirely free from the rail web, said bar having holes for clamping bolts, a bolting member of uniform sectional thickness throughout its length, said member being vertical at the bolt holes and slanting between two of the bolt holes.

9. In a rail joint, a splice bar for rails to stand entirely free from the rail web and having a bolting member and a foot member to bear on top of the rail base, said bolting member being vertical at its ends and inclined adjacent to its middle and having substantially the same sectional thickness throughout, substantially as described.

10. In a rail joint, a splice bar standing entirely free from the rail web and having a member with bolt holes through it, said member having a vertical portion adjacent to a bolt hole and a slanting portion between two bolt holes, said vertical and slanting portions being of like sectional thickness, substantially as described.

11. In a rail joint, a splice bar to stand entirely free from the rail web and having a member with bolt holes through it, said member having a vertical portion adjacent to a bolt hole and a slanting portion between two bolt holes, said portions being of like sectional thickness and having a portion of each joined to the other by means of gussets.

12. In a rail joint, a splice bar for rails having a bolting member, and a foot member to fit the rail base for a greater portion of its width, a portion of said bolting member being displaced from the general alinement of the bar, said displaced portion being partly cut loose from said member on at least one side.

13. A splice bar for rails having vertical bolting faces at its ends and an inclined bolting face adjacent to its middle, said bar having a freely depending flange extending from the middle portion of its length between the ties, substantially as described.

14. In a rail joint, a splice bar for rails to stand free from the rail web and having vertical upper members with bolt holes therethrough, an inclined member between said vertical members, and a foot member bearing on top of the rail base at the abutting edges of the rail ends, said vertical and inclined members being of like sectional thickness and a portion of each being joined to the other by means of gussets, substantially as described.

15. In a rail joint, a splice bar for rails to stand free from the rail web and having vertical upper members with bolt holes therethrough, the remainder of the upper portion of said splice bar having the greater portion of its outer face slanting, and a foot member bearing on top of the rail base at the abutting edges of the rail ends, said vertical and inclined members being of like sectional thickness and a portion of each being joined to the other by means of gussets, substantially as described.

In testimony whereof, we have hereunto set our hands,

WILLIAM P. THOMSON.
SAMUEL G. THOMSON.

Witnesses as to W. P. Thomson:
S. E. PATTERSON,
E. A. MORTON.

Witnesses as to S. G. Thomson:
M. A. GRAESSER,
C. B. GRAY.

---

Copies of this patent may be obtained for five cents each, by addressing the "Commissioner of Patents, Washington, D. C."